Patented Jan. 30, 1934

1,945,148

UNITED STATES PATENT OFFICE 1,945,148

PACKAGE AND METHOD OF PREPARING THE SAME

William A. Hughes, Morristown, N. J., assignor to The Harvel Corporation, a corporation of New Jersey No Drawing. Application December 24, 1930
Serial No. 504,631

5 Claims. (Cl. 99—8)

The present invention relates to the preparation of pyrethrum for insecticides and other similar uses, as obtained from chrysanthemum flowers; and the invention relates more particularly to the packaging of chrysanthemum flowers, and to the prepared flowers in packages for transportation to the insecticide manufacturer.

An object of the invention is to preserve the insecticidal constituents carried by the chrysanthemum flowers and which are deleteriously affected on exposure to the atmosphere.

Other objects and advantages of the invention will be apparent from the following specification of the invention.

In the pyrethrum industry tremendous losses are sustained continuously through the deleterious effect of atmospheric exposure on the insecticidal constituents of the chrysanthemum flower. However, the exact nature of the deleterious change is not known and as yet is merely a matter of surmise and conjecture. Various explanations have been offered including the theories that evaporation of the insecticidal constituent takes place with consequent loss of strength and that oxidation of the pyrethrin constituents occurs, both with consequent decrease in insecticidal value. Whether either, or both, of explanations is correct or not, it is commonly known that the pyrethrins deteriorate on exposure to the atmosphere, both when in the flower and also when prepared in the form of pyrethrum powder.

I have found that the deterioration or loss of strength of the pyrethrin of the insecticidal constituents of chrysanthemum flowers can be stopped or greatly decreased by preventing access of air to the chrysanthemum flowers. According to my invention this is done as soon as possible after the flowers have been picked, and the protective condition should be maintained as long as possible up to the time that the flowers are treated or processed for the preparation of the insecticide.

The protective condition of the present invention is obtained by sealing the flowers in an air tight container from which air has been evacuated, or by sealing in a gas tight container from which the air has been displaced by an inert gas such for example as carbon dioxide or nitrogen, or by wetting the flowers with a liquid such as one of the middle petroleums for example kerosene or a terpene such as cymene. In the latter case that is, where the liquid is used, the flowers are sprayed or dipped or otherwise provided with a coating or impregnation of the liquid, in sufficient quantity to hold in the pyrethrins and to protect the same from the atmosphere, and then packed in paper lined boxes or barrels, or otherwise packed for storage or shipment.

The amount of liquid used can be just enough to lightly drench the flowers and to produce an air tight protective coating or impregnation that will remain for long periods without seepage or draining of the liquid from the flower. The chrysanthemum flowers are kept in shipment or storage from several months to a year or more before they reach the insecticide manufacturer, and this is necessary because these flowers are brought to the United States in most part from either Europe or Asia.

When either kerosene or cymene, and especially the former, is used for the protective liquid there is the added advantage in the preparation of liquid sprays that the protective liquid is suitable for use as part of the spray material because kerosene and such like liquids are used for diluting the pyrethrum. The drenched flowers are made up into packages with coverings of wax paper and wood or tin casings to prevent the vaporization of the kerosene or other liquid from the flowers.

When pyrethrum powders are made a powder of a material such as aluminum stearate which absorbs kerosene can be used as the diluting powder or as part thereof. It is noted that in the preparation of pyrethrum powders the pyrethrum content is made very low for example around 1%, and often less, other powders of inactive materials being used in the dilution.

What I claim is:

1. The method of preserving the pyrethrum content of chrysanthemum flowers which comprises providing the flowers with a protective coating of kerosene after picking, said liquid being provided in an amount and extent to separate the pyrethrin from the atmosphere.

2. A package comprising chrysanthemum flowers with a drenching thereon of kerosene.

3. The method of preserving the pyrethrum content of chrysanthemum flowers which comprises providing the flowers with a protective coating of liquid selected from the middle petroleums, said liquid being provided in an amount and extent to separate the pyrethrin from the atmosphere.

4. A package comprising chrysanthemum flowers with a surrounding thereabout of a liquid selected from the middle petroleums.

5. A package comprising chrysanthemum flowers with a surrounding thereabout of a liquid selected from the group consisting of cymene and kerosene.

WILLIAM A. HUGHES.